United States Patent [19]

Satoh et al.

[11] Patent Number: 5,786,021
[45] Date of Patent: Jul. 28, 1998

[54] PROCESSED MATERIAL OF BEAN CURD REFUSE AND METHOD FOR THE PREPARATION THEREOF

[75] Inventors: Toshio Satoh; Hitoshi Matsumoto; Chitoshi Mori; Keiji Inouchi, all of Tokushima, Japan

[73] Assignee: E.P.D. Co., Ltd., Japan

[21] Appl. No.: 411,757

[22] PCT Filed: Aug. 10, 1994

[86] PCT No.: PCT/JP94/01325

§ 371 Date: Mar. 30, 1995

§ 102(e) Date: Mar. 30, 1995

[87] PCT Pub. No.: WO95/05088

PCT Pub. Date: Feb. 23, 1995

[30] Foreign Application Priority Data

Aug. 13, 1993 [JP] Japan ............... 5-201407

[51] Int. Cl.$^6$ ....................................... A23L 1/20
[52] U.S. Cl. ............................... 426/634; 426/507
[58] Field of Search ..................... 426/634, 507, 426/508

[56] References Cited

U.S. PATENT DOCUMENTS 5,128,165   7/1992   Wakana ................... 426/634

FOREIGN PATENT DOCUMENTS 4-190753   7/1992   Japan .

OTHER PUBLICATIONS

Patent Abstracts of Japan, JP 55–99171, Inventor: Ariyou Riyou ABS. GRP. No: C028; ABS. vol. No.: 151; ABS. Pub. Date: Oct 23, 1980.

*Primary Examiner*—Arthur L. Corbin
*Attorney, Agent, or Firm*—Nixon & Vanderhye

[57] ABSTRACT

The present invention relates to a processed material of bean curd refuse, comprising a highly viscous liquid containing cut bean curd refuse fibers and water-soluble polysaccharides released from bean curd refuse.

6 Claims, 1 Drawing Sheet

PROCESSED MATERIAL OF BEAN CURD REFUSE AND METHOD FOR THE PREPARATION THEREOF

FIELD OF INDUSTRIAL UTILIZATION

The present invention relates to a processed material of bean curd refuse (Okara in Japanese), a method of the preparation thereof, and a method of the preparation of a food containing the processed material of bean curd refuse.

TECHNICAL BACKGROUND

Conventionally, part of bean curd refuse has been used for food, and part of it has been used as livestock feed and a fertilizer. However, the percentage of its use is small. Further, it goes rotten very easily, and its water content is high (about 80%). For these reasons, bean curd refuse is mostly disposed of as an industrial refuse.

However, from the viewpoint of the science of nutrition, bean curd refuse itself contains 25% of protein, 15% of fats and 50% of a vegetable fiber, and it is too resourceful to dispose of bean curd refuse as an industrial refuse. Therefore, studies for advanced use thereof, particularly studies for the application thereof to foods are under way.

Raw bean curd refuse has been so far used as a filler by incorporating it into food materials as it is when some foods are prepared. Since, however, bean curd refuse particles scarcely have flexibility in spite of their high water content, bean curd refuse gives only foods having a rough and poor taste even when a small amount thereof is incorporated into other food materials.

For utilizing bean curd refuse as a food material, there is known another method in which bean curd refuse is once dried and then finely pulverized and the resultant dry powder is incorporated into a food material. Since, however, water contained in bean curd refuse is present as very strongly bonded water, a high temperature is required for drying the bean curd refuse, and the dried bean curd refuse mass turns brownish. Further, the so-obtained bean curd refuse mass has a very hard hardness, and it is difficult to pulverize it into particles in the order of microns. Moreover, this dry bean curd refuse powder has poor hydration properties even if it is a finely pulverized powder. Therefore, it is poor in wettability even if mixed with water, and it is difficult to obtain a homogeneous mixture even if a small amount of it is mixed with another food. The resultant food still gives the sense of roughness to the tongue and has poor taste. In short, the problem of the bean curd refuse powder is that its preparation is not easy and requires a large cost, and that it can be only applied to limited use as a food material.

For improving bean curd refuse in the pleasantness to the tongue and the taste, there is proposed a method in which bean curd refuse is directly milled in its hydrous state without adding water, to prepare a slurry of fine particles having a diameter of 100 microns or less, and the slurry is directly added to a raw material for a processed food (JP-B-61-50578). However, when an attempt is made to pulverize raw bean curd refuse into fine particles having a diameter of 100 microns or less with a general finely pulverizing apparatus, the raw bean curd refuse greatly generates heat, and the processed bean curd refuse rather shows a decreased hydration power.

For avoiding the above problems even slightly, there is concurrently proposed a method in which bean curd refuse is once frozen and then treated in the same manner. In this method, however, it is required to pulverize bean curd refuse exhausted at a high temperature (about 80° C.) after it is once frozen, and then finely mill it. This method is therefore not only poor in workability but also requires an additional cost.

For overcoming the above problems, there is proposed a method in which water is added to bean curd refuse, the bean curd refuse is ground with a grinder with an intentional smaller clearance while it generates heat, added water is evaporated to prepare a finely ground material having a water content equivalent to, or smaller than, that of bean curd refuse, and the finely ground material is refrigerated (JP-A-4-190753). However, in this case, bean curd refuse is treated while it generates heat, and then treated so that the water content decreases. Therefore, the resultant processed material has a low water content, and has the property of retaining its form. When mixed with other food material, the processed material of bean curd refuse decreases the viscosity of the mixture since it has a low viscous nature itself, and its use is limited. Further, when refrigerated, this processed material shows a greatly decreased viscosity and gets dry, and its use is further limited.

Further, all of the above methods of decreasing the size of the bean curd refuse particles (into about 100 microns or less) inevitably have a defect in that a product is deteriorated in quality since an apparatus suffers large mechanical wear so that the product often includes grinder powders, etc., derived from the apparatus.

In the above methods of processing bean curd refuse by fine milling, even if bean curd refuse particles are finely milled, the bean curd refuse particles contain bean-curd-refuse-interfiber polysaccharides as they are, and after the bean curd refuse is cooked, a matrix of water-insoluble fibers (cellulose, hemicellulose) is fixed as well while the matrix contains the polysaccharides. Therefore, the bean curd refuse particles have an increased hardness.

Further, the mere fine milling of bean curd refuse by the above finely milling treatment is not sufficient for fully increasing the viscosity. That is, even if fine milling treatment is applied, bean curd refuse particles decrease in size and are dispersed in water in a colloidal state, and the viscosity increases to some extent due to the hydrophilic strength of each particle, but they only form a slurry-like viscous material.

The above conventional methods of fine milling bean curd refuse merely take bean curd refuse as a filler for a food, and attach importance to not deteriorating the taste of a food to which bean curd refuse is added, by merely seeking to finely mill the bean curd refuse. However, bean curd refuse contains about 50%, based on its solid content, of vegetable fibers composed mainly of pectin, and if they can be utilized, bean curd refuse can be converted from a mere filler to a highly functional material for processed food.

DISCLOSURE OF THE INVENTION

It is therefore an object of the present invention to provide bean curd refuse not as a mere filler but as a novel material for a processed food having higher functions.

More specifically, it is an object of the present invention to provide a highly functional processed material of bean curd refuse and a process for the preparation thereof, which material and method simultaneously accomplish the following.

(1) to completely utilize excellent nutrition components of bean curd refuse by improving the properties of the bean curd refuse itself instead of using the bean curd refuse by extracting part of its components, (2) to retain fibers contained in bean curd refuse particles, as fibers, and to impart processed bean curd refuse with the properties of a healthy food containing a large amount of vegetable fibers, (3) to overcome the rough-feeling to the tongue and rough taste characteristic of bean curd refuse by improving the properties of the bean curd refuse, so that the utility of the bean curd refuse as a food material is improved, (4) to impart the processed material of bean curd refuse with a high viscosity, so that it can be incorporated into other food materials while it is in harmony with the properties of these materials, and (5) to impart the processed material of bean curd refuse with novel physicochemical properties so that the processed material exhibits unconventional novel properties.

It is further another object of the present invention to provide a method of the preparation of a food prepared by using the above highly functional processed material of bean curd refuse.

Studies by the present inventors have revealed that, for converting the processed material of bean curd refuse to a material for a highly functional processed food while utilizing the physicochemical properties of vegetable fibers such as pectin, etc., it is very important to free water-soluble polysaccharides in bean curd refuse fibers from the matrix of cellulose and hemicellulose and water-solubilize them. For this purpose, when the highly functional processed material of bean curd refuse of the present invention is produced, it is required to carry out hydration-treatment of bean curd refuse so that released water-soluble polysacchalides may bond to sufficient free water.

That is, the present inventors have found that, for the purpose of releasing an interfiber substance contained in bean curd refuse particles, the bean curd refuse particles are beaten by one or a combination of milling, cutting, grinding and crushing means so that the bean curd refuse particles do not retain their particle forms, whereby water-soluble polysaccharides as the inter-fiber substance are released into water, and these polysaccharides bond to free water in the bean curd refuse to give a highly functional processed material of bean curd refuse having a high viscosity. And, the present invention has been accordingly completed.

PREFERRED EMBODIMENTS FOR WORKING THE INVENTION

The processed material of bean curd refuse of the present invention comprises a highly viscous liquid containing cut bean curd refuse fibers and water-soluble polysaccharides released from bean curd refuse. This processed material can be explained as follows while comparing its microscopic photograph and a microscopic photograph of bean curd refuse as a raw material.

Figure 1A:
FIG. 1(a) is a microscopic photograph showing the structure of bean curd refuse as a material.

FIG. 1(a) is the microscopic photograph of bean curd refuse as a material. This FIG. 1(a) shows that fibers constituting bean curd refuse are regularly bundled and that masses containing an inter-fiber substance and having a size of approximately 500 to 1,000 microns are dispersed therein.

Figure 1B:
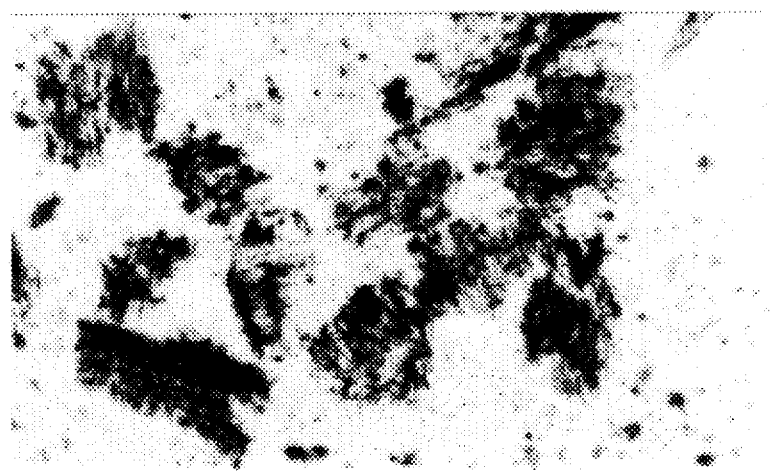
FIG. 1(b) is a microscopic photograph showing the structure of bean curd refuse treated by cutting. Further.
Figure 1C:
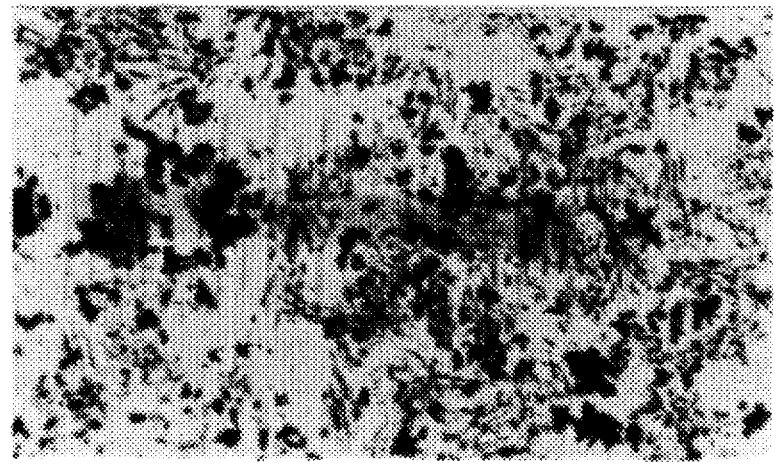
FIG. 1(c) is a microscopic photograph showing a processed material of bean curd refuse of the present invention, obtained by cutting and then milling treatment.

On the other hand, FIG. 1(c) is the microscopic photograph of a highly functional processed material of bean curd refuse of the present invention, obtained by beating treatment. This FIG. 1(c) shows that the above bean curd refuse masses are in a beaten state, that the fibers which have constituted the matrix are cut into sizes of approximately 100 to 300 microns and irregularly dispersed, and that water-soluble polysaccharides as bean-curd-refuse-interfiber substance are released. Further, it is shown that particles having a diameter of approximately 20 to 100 microns (which are considered protein particles insolubilized by thermal modification during the production of bean curd) are released out of the fibers and dispersed.

As described above, the highly functional processed material of bean curd refuse of the present invention is not a material obtained by merely pulverizing and finely milling bean curd refuse masses, but it comprises a highly viscous liquid obtained by beating fibers which are in a matrix state, and releasing and hydrating water-soluble polysaccharides which are interfiber substances in the matrix. The term "liquid" should be understood in a wide sense, and it includes a paste, etc. That is, the highly functional processed material of bean curd refuse of the present invention has a higher water content than it has before processed, and as a result of this hydration treatment, it has an improved viscosity. Further, it has fluidity as one of its properties, and it can be applied to a variety of uses by mixing it with other food materials.

Therefore, the highly functional processed material of bean curd refuse is not necessarily required to be of small particles (about 100 microns or less), and the object thereof is achieved by beating the particles. That is, the highly functional processed material of bean curd refuse of the present invention shows remarkably improved feeling to the tongue even if it contains remaining fibrous substances having a fiber length of 100 to 500 microns after bean curd refuse is beaten.

The paste obtained by the above processing generally has a viscosity of about 7 to $15 \times 10^3$ centipoise (room temperature), while it gives a processed material having a higher viscosity when subjected to heat treatment such as sterilizing retort treatment or continuous heating sterilization treatment.

Further, the processed material of the present invention may contain a seasoning and/or an edible oil and a fat as optional components. The seasoning includes amino acid-containing, nucleic acid-containing and succinic acid-containing seasonings. The edible oil and fat include plant oils (salad oil, palm oil, corn oil, rape-seed oil, safflower oil and sesame-seed oil), butter and hydrogenated fish oil.

According to the present invention, the above processed material of bean curd refuse is produced by any one of the following methods (A) and (B).

Method (A)

A method of the preparation of a processed material of a highly viscous liquid, which comprises hydration-treating bean curd refuse by adding water, and beating the bean curd refuse while releasing an interfiber substance to hydrate water-soluble polysaccharides.

Method (B)

A method of the preparation of a processed material of bean curd refuse, which comprises hydration-treating bean curd refuse by optionally adding water, beating the bean curd refuse to release an interfiber substance, then hydration-treating the bean curd refuse by adding water, and stirring the resultant mixture to hydrate water-soluble polysaccharides to obtain a highly viscous liquid.

The method (A) will be explained first.

Bean curd refuse is very dry and rough, since the milking ratio is set as high as possible for improving the yield of soybean milk and the amount of free water adhering to the bean curd refuse is small although the water content in the bean curd refuse is high (75 to 85%).

In the method (A), therefore, bean curd refuse is hydration-treated with water in an amount, for example, of 30 to 400% based on the weight of the bean curd refuse to feed free water, and the bean curd refuse is beaten. This beating treatment is preferably carried out by finely milling the bean curd refuse and then beating it. The term "finely milling" refers to decreasing the size of bean curd refuse by cutting particles of the bean curd refuse (the term "cutting" has a wide concept including crushing in addition to the cutting in a narrow sense). Further, the term "beating treatment" refers to destroying the form of bean curd refuse by milling (the term "milling" has a wide concept including "grinding", etc., in addition to the milling in a narrow sense) so that interfiber water-soluble polysaccharides are released from a matrix of water-insoluble fibers. That is, water-soluble polysaccharides which are interfiber substances are released by this beating treatment, and bond to (hydrated by) added free water to give a highly functional processed material of bean curd refuse of the present invention which comprises a highly viscous liquid.

The above will be explained with reference to drawings. When bean curd refuse as a raw material shown in FIG. 1(a) is treated by cutting, the bean curd refuse is brought into a state as shown in FIG. 1(b) in which the length of fibers is decreased to approximately ¼ to ½ of their original length while the fibers nearly retain their regularity, most of the interfiber substances remain, and they are partially released out of the fibers.

Then, when the bean curd refuse is milled, as shown in FIG. 1(c), there is obtained the highly functional processed material of bean curd refuse of the present invention, which comprises a highly viscous liquid containing fibers which are cut and beaten and free of regularity, and water-soluble polysaccharides released from the bean curd refuse fibers.

The above explains the method of consecutively carrying out the cutting of fibers by the finely milling treatment and the beating treatment intended for releasing the intra-fiber substance, while the cutting, milling and beating may be carried out at the same time, and in this case, similar effects can be also obtained.

The method (B) will be explained hereinafter. This method (B) differs from the method (A) only in that, in the method (B), a substantial amount of water is added after the beating treatment and the hydration treatment is carried out to feed free water. That is, in the method (B), no water is added, or water in an amount of, for example, less than 30% of the weight of bean curd refuse is added before the beating treatment, and water in an amount of 30 to 400% of the weight of a bean curd refuse is added after the beating treatment. In the method (B) as well, water-soluble polysaccharides released from the bean curd refuse fibers bonds to free water to give a processed material of bean curd refuse comprising a highly viscous liquid.

Further, bean curd refuse having a high water content is prepared by decreasing the soybean milking ratio for the purpose of obtaining a highly functional processed material of bean curd refuse, and beaten to hydrate water-soluble polysaccharides, whereby similar effects can be produced.

Examples of the high functions of the processed material of bean curd refuse of the present invention will be explained hereinafter.

First, the processed material of bean curd refuse of the present invention exhibits excellent properties as batter for fried foods.

That is, when proper amounts of water and flour are added to the processed material of bean curd refuse of the present invention, there is obtained a batter liquid excellent in parting from an oil as is not expected from any commercially available premixed batter. When a fried food is cooked with this batter liquid by a conventional method, there can be obtained a food which is excellent in the clear and crunchy feeling characteristic of a fried food and excellent in taste.

As described above, it is very specific that the processed material of bean curd refuse of the present invention has the property of showing a high viscosity at room temperature and showing a decreased viscosity or losing the viscosity when cooked under heat, and this is why the processed material of bean curd refuse of the present invention has high functions. The processed material of bean curd refuse of the present invention also exhibits the above characteristic property when used for other foods cooked with an oil such as tempura, fritters and mustard lotus root (karashi renkon), and these foods are similarly excellent in the feeling to the mouth and the taste.

As the second example in which the processed material of bean curd refuse of the present invention exhibits high functions, there is the preparation of noodles. When a proper amount of the processed material of bean curd refuse of the present invention is added during the preparation of boil-cooking noodles or steam-cooking noodles., there are obtained remarkable effects that the noodles are well disentangled, that the taste is excellent and that the elasticity is maintained while the noodles give the sense of softness. Moreover, there is also a filler effect. Further, there is an effect that it improves cooked noodles to a great extent in the elongation (aging) which is a large problem to cooked noodles, and the noodles are almost free from breaking into small pieces when cooked. There can be therefore provided noodles suitable for noodles cooked in broth.

As the third example in which the processed material of bean curd refuse of the present invention, there are pan-broiled or baked foods such as a Chinese meat dumpling, a pizza, a meat or seafood and vegetable pancake and a crepe. When a proper amount of the processed material of bean curd refuse of the present invention containing an edible oil is added when the above foods are prepared, there can be obtained foods which are almost free of browning or browning to excess without treating cooking utensils with an oil. In this case, it is not required to add other emulsifier at the time of adding an edible oil or fat, since the processed material of bean curd refuse of the present invention has the emulsifying capability itself, which is also one of the functions of the processed material of bean curd refuse of the present invention.

Further, the processed material of bean curd refuse of the present invention has the effect of improving the feeling to the mouth and the filler effect when a proper amount of it is added for the preparation of baked confectionery such as a cracker, a biscuit, a cookie, a rice cracker, pastry and a bun, food pastes such as boiled fish paste, baked foods such as bread, frozen confections such as ice cream, ice candy and sherbet and steamed foods such as a bun with a bean-jam filling and a steamed Chinese pork dumpling wrapped in a thin flour-and-water pancake.

Further, the processed material of bean curd refuse of the present invention is useful as a filler having good taste for a croquette and bean-jam.

The present invention will be further explained hereinafter with reference to Examples.

EXAMPLE 1

Water in an amount of 1 liter was added to 500 g of fresh bean curd refuse (water content 78%), and the mixture was cut and milled with a biolizer(supplied by Nippon Seiki K.K.) at 10.000 rpm for about 1 hour to give a highly functional processed material (1) of bean curd refuse having cut fibers having an average length of 60 microns and having a viscosity of $15 \times 10^3$ centipoise (25° C.).

EXAMPLE 2

A concentrated natural amino acid seasoning (amino acid content 32%) in an amount of 10 ml and 30 ml of an edible oil (salad oil) were added to the processed material (1) of bean curd refuse obtained in Example 1, and the mixture was further milled for 15 minutes to give a processed material (2) of bean curd refuse of the present invention.

EXAMPLE 3

Water in an amount of 20 liters was added to, and mixed with, 100 kg of fresh bean curd refuse (water content 78%), and the mixture was treated with a Masukolloider(supplied by Masuko K.K.) twice. And, 180 liters of water having a temperature of 80° C. was added to the resultant mass having the form of a rice cake, and the mixture was stirred with a DC stirrer to give a processed material (3) of bean curd refuse of the present invention having cut fibers having an average fiber length of 200 microns and having a viscosity of $60 \times 10$ centipoise (25° C.).

EXAMPLE 4

Water in an amount of 40 liters was added to, and mixed with, 40 kg of fresh bean curd refuse (water content 78%), and the mixture was treated with a Masukolloider twice to give a processed material (4) of bean curd refuse of the present invention containing cut fibers having an average fiber length of 230 microns and having a viscosity of $48 \times 10^3$ centipoise (25° C.).

EXAMPLE 5

A concentrated liquid amino acid seasoning in an amount of 1 kg was added to, and mixed with, 10 kg of the processed material (4) of bean curd refuse obtained in Example 4. Plastic containers were charged with 2 kg of the mixture each, sealed and treated with a retort sterilizer at 123° C. for 20 minutes to give a processed material (5) of bean curd refuse of the present invention having a viscosity of $138 \times 10^3$ centipoise (25° C.).

EXAMPLE 6

Water in an amount of 50 liters was added to, and mixed with, 100 kg of fresh bean curd refuse (water content 80%), and the mixture was pulverized with a high-speed cutting machine (supplied by German Stephen GmbH) to prepare a slurry containing fibrous masses having a size of 150 to 500 microns. And, 46 liters of water was further added to 140 g of this slurry, and the mixture was treated with a Maskolloider once to give a processed material (6) of bean curd refuse of the present invention containing cut fibers having an average fiber length of 260 microns and having a viscosity of $25 \times 10^3$ centipoise (20° C.).

EXAMPLE 7

A liquid palm oil in an amount of 10 kg was added to 150 kg of the processed material (6) of bean curd refuse obtained in Example 6, and these materials were uniformly mixed with each other with a mixer. The resultant uniform mixture was treated with a continuous sterilizer at 140° C. to give a processed material (7) of bean curd refuse of the present invention having a viscosity of $39 \times 10^3$ centipoise (20° C.).

Food Preparation Example 1 (Fried Prawns)

Water in an amount of 140 milliliters and 30 g of flour (weak flour) were added to, and uniformly mixed with, 200 g of the processed material of bean curd refuse (5) obtained in Example 5, to prepare a batter liquid. Headless shell-removed "black tiger" prawns were treated with flour and immersed in the above batter liquid, and coated with flour. In this case, the prawns were intimately coated with a sufficient amount of the flour. Then, the coated prawns were treated in oil at 180° C. for 3 minutes to give fried prawns (A).

The above-obtained fried prawns were sensory-tested by six panelers for color tone, feeling to the mouth and taste. This test was carried out on the basis of the comparison of the above fried prawns with fried prawns prepared, as standard food (S), by treating the same prawns as the above with flour, immersing them in an egg liquid, coating them with flour and treating them in oil under the same conditions. Table 1 shows the results. For comparison, further, the same sensory test was effected on fried prawns (B) obtained by treating prawns with flour, immersing them in a batter composition prepared by dispersing a commercially available batter mix (containing natural flour paste) in water according to its instructions, coating them with flour and treating them in oil under the same conditions. Table 1 also shows the results of this test.

TABLE 1

| Fried prawns | Batter composition | Color Tone | Feeling to to the mouth | Taste |
|---|---|---|---|---|
| (S) Standard | Egg liquid | Standard color | Standard feeling to the mouth | Standard taste |
| (A) | Batter composition of Preparation Example 1 | Close to (S) (4) Denser than (S) (2) | Crunchier than (S) (4) Nearly equal to (S) (2) | Far more delicious than (S) (5) Nearly equal to (S) (1) |
| (B) | Commercially available batter composition | Denser than (S) (5) Far denser than (S) (1) | Nearly equal to (S) (2) Softer than (S) (4) | (S) is more delicious (3) Nearly equal to (S) (3) |

As is clear from Table 1, fried prawns (A) obtained by incorporating the processed material (5) of bean curd refuse of the present invention were equivalent to, or excellent over, the fried prawns (S) obtained by incorporating the egg liquid, in the color tone, feeling to the mouth and taste, and much superior to the fried prawns (B) obtained by incorporating the commercially available batter composition.

Food Preparation Example 2 (Croquette)

Water in an amount of 250 milliliters and 20 g of flour (weak flour) were added to, and uniformly mixed with, 200 g of the processed material (5) of bean curd refuse obtained in Example 5, to prepare a batter liquid. 540 Grams of the processed material (5) of bean curd refuse and 100 g of dry mashed potatoes were kneaded with a mixer for 5 minutes, and then, minced carrot (30 g), onion (40 g) and salt (4 g) were added. The resultant mass was mixed for 2 minutes, and then shaped into pieces in the form of a croquette. These pieces were immersed in the above batter liquid, coated with flour and treated in oil at 175° C. for 4 minutes.

In this case, the croquettes themselves did not go under the oil during the treatment in oil, and it was remarkably well to cook them. The oil-treated croquettes were light brownish and crunchy to the mouth and tasted good. These croquettes gave almost no change in the feeling to the mouth and tasted good after allowed to stand at room temperature for 3 hours.

Food Preparation Example 3 (Boiled noodles)

500 Grams of the processed material (5) of bean curd refuse was dispersed in 1.75 kg of salt water containing 250 g of salt, and the dispersion was added to 12.5 kg of flour (medium flour). The resultant mass was mixed with a mixer at room temperature for 10 minutes. Then, the mass was subjected to a roll method noodle-dough-making apparatus and three-stage finished to give a rolled flat dough. The dough was aged by allowing it at room temperature for 1 hour, and then cut with a No. 10 blade to give raw noodles.

The above-obtained raw noodles were immersed in boiling water for 22 minutes, and washed with cold water to give 33.4 kg of boiled noodles (A).

As a control, boiled noodles (S) were prepared in the same manner as above except that no processed material of bean curd refuse was added and that the time for boiling was changed to 18 minutes. These boiled noodles (S) had a weight of 29.8 kg. A clear filler effect was therefore recognized when the highly functional processed material of bean curd refuse of the present invention was added. Further, the noodles (A) containing the highly functional processed material of bean curd refuse of the present invention were found to have various improvements in the feeling to the mouth, such as giving the sense of sweetness and softness as compared with the noodles (S) prepared for a control, and yet, maintaining elasticity and exhibiting the clear sense of parting from the teeth. Further, the noodles (A) were also found to be disentangled far more easily than (S).

Food Preparation Example 4 (Ice cream)

20 Grams of a skim milk powder, 42 g of soft shortening, 65 g of sugar and a proper amount of vanilla essence were added to 230 g of the processed material (4) of bean curd refuse obtained in Example 4, and while the mixture was stirred, it was heated to 65° C. Further, the mixture was kneaded with an electric mixer for 5 minutes to obtain a uniform paste. The paste was flown into an angled container of stainless steel and allowed to stand at -20° C. for 2 hours while it was intermittently stirred, to give ice cream.

The above ice cream was free from giving the sense of roughness and was smooth to the tongue.

Food Preparation Example 5 (White bean-paste ball)

Dry mashed potato in an amount of 1 kg was added to 5.4 g of the processed material (4) of bean curd refuse obtained in Example 4, and the mixture was uniformly kneaded. Then, 3 kg of a white raw bean-paste base and 6 kg of an invert sugar liquid were added to the above kneaded product, and the mixture was boiled down, and kneaded to give white bean-paste balls. These white bean-paste balls were clear in color, smooth and excellent in maintaining their form.

Food Preparation Example 6 (Crepe)

Water in an amount of 100 milliliters, 40 g of flour, one egg and a proper amount of salt were added to, and uniformly mixed with, 100 g of the processed material (7) of bean curd refuse obtained in Example 7, and the mixture was baked on a hot plate of iron to prepare crepe. The above mixture was excellent in extendibility on the plate of iron and showed no browning when the baking finished. Further, it was with the sense of softness to the mouth and full of elasticity.

As explained above, according to the present invention, there is provided a highly functional processed material of bean curd refuse and a process for the production thereof. When the processed material of bean curd refuse of the present invention is used for the preparation of various foods, there can be obtained foods excellent in the taste, the feeling to the mouth, the color tone, etc., owing to its highly functional performances.

We claim:

1. A processed material of bean curd refuse, which comprises a highly viscous liquid containing cut bean curd refuse fibers and water-soluble polysaccharides released from bean curd refuse.

2. A food product comprising the processed material of claim 1.

3. The processed material of bean curd refuse according to claim 1, wherein the processed material further contains a seasoning and/or an edible oil or fat.

4. A food product comprising the processed material of claim 3.

5. A method of the preparation of a processed material of a highly viscous liquid from bean curd refuse, which comprises (1) adding water to said bean curd refuse in an amount of 30 to 400% by weight based upon the weight of the bean curd refuse, and then (2) beating the bean curd refuse thereby releasing an interfiber substance composed of water-soluble polysaccharides and hydrating said water-soluble polysaccharides.

6. A method for the preparation of a highly functional processed material of a highly viscous liquid, which comprises (1) optionally adding water to bean curd refuse, then beating the bean curd refuse to release an interfiber substance composed of water-soluble polysaccharides and (2) adding water to said interfiber substance in an amount of 30 to 400% by weight based upon the weight of the bean curd refuse to obtain a highly viscous liquid and to hydrate said water-soluble polysaccharides.

* * * * *